United States Patent
Paganelli (10) Patent No.: US 10,062,915 B2
(45) Date of Patent: Aug. 28, 2018

(54) ELECTROCHEMICAL REACTOR, SUCH AS A FUEL CELL OR AN ELECTROLYSER, PROVIDED WITH A DEVICE FOR MEASURING A PARAMETER OF A GAS SPECIFIC TO THE OPERATION OF SAID REACTOR

(75) Inventor: Gino Paganelli, Belfaux (CH)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 709 days.

(21) Appl. No.: 13/497,011

(22) PCT Filed: Sep. 24, 2010

(86) PCT No.: PCT/EP2010/064109
§ 371 (c)(1),
(2), (4) Date: May 30, 2012

(87) PCT Pub. No.: WO2011/036236
PCT Pub. Date: Mar. 31, 2011

(65) Prior Publication Data
US 2012/0237843 A1    Sep. 20, 2012

(30) Foreign Application Priority Data
Sep. 25, 2009   (FR) .................................... 09 04594

(51) Int. Cl.
*H01M 8/04* (2016.01)
*H01M 8/24* (2016.01)
(Continued)

(52) U.S. Cl.
CPC ............. *H01M 8/0444* (2013.01); *C25B 1/10* (2013.01); *C25B 15/02* (2013.01);
(Continued)

(58) Field of Classification Search
CPC ............ H01M 8/0444; H01M 8/2483; H01M 8/04231; H01M 8/04492; H01M 8/2465
See application file for complete search history.

(56) References Cited

U.S. PATENT DOCUMENTS

| 6,461,751 B1 | 10/2002 | Boehm et al. .................. 429/13 |
| 2002/0110713 A1 | 8/2002 | Reindl et al. ................... 429/22 |

(Continued)

FOREIGN PATENT DOCUMENTS

| CA | 2 655 605 C | 3/2008 |
| JP | 8-184576 A | 7/1996 |

(Continued)

OTHER PUBLICATIONS

FuelCellStore.com-bipolar plate.*
INPI Communication dated May 7, 2010.
International Search Report dated Apr. 14, 2011.

*Primary Examiner* — Jonathan Crepeau
*Assistant Examiner* — Angela J Martin
(74) *Attorney, Agent, or Firm* — Fitzpatrick, Cella, Harper & Scinto (57) ABSTRACT

An electrochemical reactor, such as a fuel cell stack or an electrolyzer, includes a stack of electrochemical cells, a manifold, a sensor, and a monitor. Each electrochemical cell includes an electrode plate having a face in electrical contact with an electrolyte. The manifold is connected to the faces of the electrochemical cells in an exchange circuit, for exchanging a gas with outside of the stack. The sensor is sensitive to a composition of the gas in the circuit. The monitor monitors or controls an operational condition of the electrochemical reactor in response to measurements by the sensor. The stack and the manifold form a one-piece reactor body. A chamber is integrated into the body in communication with the manifold. The sensor is mounted in the body (Continued)

and includes a sensitive or sensing unit exposed directly to an in situ concentration of a component of the gas in the chamber.

16 Claims, 6 Drawing Sheets

(51) Int. Cl.
*H01M 8/0444* (2016.01)
*H01M 8/2483* (2016.01)
*C25B 1/10* (2006.01)
*C25B 15/02* (2006.01)
*H01M 8/04223* (2016.01)
*H01M 8/04492* (2016.01)
*H01M 8/2465* (2016.01)
*H01M 8/04089* (2016.01)
*H01M 8/04119* (2016.01)
*H01M 8/04082* (2016.01)
*H01M 8/1018* (2016.01)

(52) U.S. Cl.
CPC ... *H01M 8/04231* (2013.01); *H01M 8/04492* (2013.01); *H01M 8/2465* (2013.01); *H01M 8/2483* (2016.02); *H01M 8/045* (2013.01); *H01M 8/04097* (2013.01); *H01M 8/04119* (2013.01); *H01M 8/04164* (2013.01); *H01M 8/04201* (2013.01); *H01M 8/04238* (2013.01); *H01M 8/04447* (2013.01); *H01M 8/04455* (2013.01); *H01M 8/04507* (2013.01); *H01M 2008/1095* (2013.01); *Y02E 60/366* (2013.01)

(56) References Cited

U.S. PATENT DOCUMENTS

| | | | |
|---|---|---|---|
| 2003/0059656 A1 | 3/2003 | Horiguchi et al. | 429/17 |
| 2003/0141200 A1 | 7/2003 | Harada | 205/637 |
| 2004/0247984 A1 | 12/2004 | Ismaier et al. | 429/38 |
| 2005/0147863 A1 | 7/2005 | Hiramatsu et al. | 429/34 |
| 2005/0228596 A1 | 10/2005 | Shoji | 702/24 |
| 2005/0282060 A1* | 12/2005 | DeFillippis | H01M 8/0258 429/447 |
| 2006/0062982 A1* | 3/2006 | Hammond Cunningham et al. | 428/220 |
| 2009/0061261 A1 | 3/2009 | Hatta et al. | 429/12 |
| 2009/0239128 A1* | 9/2009 | Keyser | H01M 8/0204 429/432 |
| 2009/0291342 A1 | 11/2009 | Tezuka et al. | 429/24 |
| 2010/0003549 A1 | 1/2010 | Ota et al. | 429/13 |
| 2010/0178576 A1 | 7/2010 | Olsommer et al. | 429/434 |

FOREIGN PATENT DOCUMENTS

| | | | | |
|---|---|---|---|---|
| JP | 2001-124716 A | | 5/2001 | |
| JP | 2003-221690 A | | 8/2003 | |
| JP | 2003-294675 A | | 10/2003 | |
| JP | 2005-093111 A | | 4/2005 | |
| JP | 2005-129312 A | | 5/2005 | |
| JP | 2005-251434 A | | 9/2005 | |
| JP | 2006-131957 A | | 5/2006 | |
| JP | 2006-185595 A | | 7/2006 | |
| JP | 2007-280933 A | | 10/2007 | |
| JP | 2008-191019 A | | 8/2008 | |
| WO | WO 2007/045416 A2 | | 4/2007 | |
| WO | WO 2008/032838 | * | 3/2008 | H01M 8/04 |

* cited by examiner

Fig. 6

ELECTROCHEMICAL REACTOR, SUCH AS A FUEL CELL OR AN ELECTROLYSER, PROVIDED WITH A DEVICE FOR MEASURING A PARAMETER OF A GAS SPECIFIC TO THE OPERATION OF SAID REACTOR

FIELD OF THE INVENTION

The present invention relates to electrochemical reactors, such as fuel cell stacks or electrolysers. More particularly, it relates to devices for taking measurements for the purpose of monitoring the state of such equipment and operational control thereof.

PRIOR ART

Electrochemical reactors are presently the subject of many studies in the context of striving to limit environmental pollution, especially in the transport field. Among the currently most studied systems are without doubt electrolytic hydrogen-fuel generators, which use air or pure oxygen as oxidant. The use of solid-state electrolytes in the form of water-impregnated polymer membranes has enabled considerable progress to be made. There has also been considerable development in electrolysers, especially for storing electrical energy in chemical energy form. Current constructions allow fuel cell stacks and electrolysers operating with good efficiency and under extremely safe conditions to be envisaged.

However, improvements remain to be made from an economic standpoint, because of the high cost of certain necessary materials (for example catalysts) and the difficulties encountered for achieving optimum operating conditions and for maintaining them over the course of time. One of these difficulties lies in the fact that the current systems do not allow a thorough understanding of the internal operating conditions of the reactor, by not having all the measurements that could prove necessary or useful beyond the gas temperature and pressure measurements, which are in any case to be performed accurately. In the case of a fuel cell stack, it has therefore been conventionally necessary to ensure beforehand the high quality, especially in terms of purity, of the hydrogen used for supplying the fuel cell stack. Despite these precautions, it is then necessary to operate the stack "blind" in respect of the purity of the hydrogen actually used by the stack.

Moreover, a fuel cell stack is still today largely a device in the experimental stage. Many studies are still under way that could benefit from a means for better determining and understanding the operation of the reactors and the various components thereof, if possible in real time, without interfering with the operation of the system investigated. In most industrial electrolysis plants, or in the laboratory, gas analysers continue to be used for delivering information relating to the composition of the gases present in the electrochemical reactor during its operation. In fact, these analysers operate by taking, intermittently or continuously, samples of gases produced by the electrolyser or consumed by the fuel cell stack. The samples taken are sent to an analyser that delivers the desired information about the concentration of one or more gases produced by the electrolyser. The samples thus taken from the reactor are then discarded, which represents a loss of efficiency.

In recent years, proposals have been developed for using, especially for monitoring purposes, sensors for measuring a concentration of a gas, especially hydrogen, in gases in the environment of fuel cell stacks, which sensors are based on measuring the thermal conductivity using a sensitive (i.e., sensing) unit having a resistance heating element, the heating or dissipative cooling of which depends on the thermal conductivity of the surrounding gas and therefore in general on the composition thereof. These sensors, which are relatively compact and simple to operate, are particularly well suited for measuring the hydrogen content of a gas because of the very high thermal conductivity of hydrogen compared to that of the majority of usual gases with which it is likely to be mixed.

Thus, Patent Application published under number U.S. 2005/0228596 also describes the use of a sensor which is sensitive to the hydrogen concentration in the environment of a fuel cell system for a motor vehicle, by measuring the conductivity of the gaseous medium in question, which may contain, apart from hydrogen, various impurities coming from the air or may have a relatively high moisture content. The above document describes a technique suitable for delivering a measurement free of the errors that may be caused by the presence of moisture or other impurities in the gas mixture monitored, despite the non-linearity of the relationships linking the various parameters that affect the conductivity of a hydrogen-based mixture in certain situations. Among the measures taken, this document describes in particular the use of means for protecting the sensitive element of the gas sensor from moisture, for example by providing a sinuous path or forming a baffle in communication between the gas to be monitored and the sensitive element, or by covering the sensitive element with a protective coating, for example silica-based coating. The measurements are preferably carried out at various sensitive points in the fuel cell system and even, additionally, in the vehicle equipped with such a fuel cell. An alarm is triggered when the measurements indicate that there is a safety hazard, and the hydrogen supply to the fuel cell may then be interrupted. However, the system described does not include arrangements suitable for effectively monitoring or controlling the operating conditions of the fuel cell.

Japanese Patent Application published under the number JP 2008191019 explains how it is possible to operate a gas concentration sensor based on conductivity measurements by placing the sensor away from the line in which the gas to be monitored flows, placing several enclosures along the communication path between this line and the sensitive element in order to retard the propagation of impurities, and especially water vapour, that are liable to falsify the measurement and impair the sensor. The sensor is installed on the hydrogen discharge line of a fuel cell stack (not shown). Arrangements are proposed for preventing the water vapour necessarily contained in the discharged hydrogen gas coming into contact with the sensitive element of the sensor, in particular by using a water-repellent filter made of tetrafluoroethylene and a shut-off valve controlled by means of a motorised worm screw which makes it possible to isolate the chamber in which the sensor lies from the line in which the gas to be monitored flows. This arrangement doubtless allows certain information about the content of the hydrogen mixture in the discharge circuit to be obtained, by limiting the influence of moisture on the measurement. However, it does not appear that the arrangements described are appropriate for precisely and rapidly monitoring or controlling the operating conditions of such a fuel cell.

More recently, the published Patent Application U.S. 2009/00611261 for example describes the use of a device for detecting a physical parameter of a gas flowing in a line, in which a detection element placed in a chamber is separated from the interior of said line by a filter made of a fibrous material that prevents a deposit or film of liquid water from forming on the detection element. The filter and the treatment of the walls of the chamber prevent the presence of liquid water or water vapour in the gas flowing in the line from falsifying the indications from this element in said chamber. In one example considered, the detection element comprises an electrical resistance heating element, the heating temperature of which may vary depending on the concentration of a gas in its environment. The detection device may be used to detect the hydrogen concentration of a gas to be monitored, including in the case when the hydrogen concentration is high or in the presence of water vapour. In one example, the document describes a fuel cell system for delivering motive energy to a vehicle, which system comprises a stack of electrochemical cells supplied with hydrogen gas on the one hand and with oxygen-rich gas, for example air, on the other. At the outlet of the cell stack, the hydrogen circuit includes a line for discharging the hydrogen gas not consumed in the cell stack. A pump serves to recirculate the stream of recovered hydrogen in said discharge line to the hydrogen inlet of the stack. This stream is added to a stream of fresh hydrogen gas coming from a pressurized tank and the combination is injected into the inlet of the cell stack. The hydrogen gas discharge line is also selectively connected to the outside of the system via a purge valve which makes it possible, by on-off action, to discharge some of the hydrogen recovered at the outlet of the stack. According to the document, such a hydrogen concentration detection device, as described above, is preferably placed in the hydrogen discharge line outside the stack in order to control a valve for regulating the pressure of the gas supply coming from the hydrogen tank and also the purge valve, according to the concentration detected. According to the document, the detection device may also be placed downstream of the recirculating pump or even downstream of the pressure-regulating valve. However, according to that document, the first arrangement mentioned, namely that upstream of the recirculating pump, is preferred as the concentration measurements are less prone to error at this point. Other fuel cell system architectures are also described with various arrangements of one or more gas concentration detection devices in the hydrogen or oxygen gas circuit.

The fuel cell system thus described in the above example has the benefit of providing information about the behaviour or operation of the fuel cell stack, without requiring samples to be taken of gas mixtures in the circuits of the stack in order to send the samples to the outside of the system for the purpose of analysing them. This information can be used to act on control members governing its operation, such as the intake pressure of the fresh hydrogen at the inlet of the stack and the opening of the purge valve in order to modify this behaviour or operating characteristic. Thus, it provides a means of controlling the operating performance of the system.

It might be tempting to deduce from this that it controls the stack itself from the knowledge in real time that it could make it possible about the internal hydrogen concentration for the purpose of permanently optimising the operation of the stack. However, practice shows that such is not the case, because of the still very approximate nature of the information that can be obtained with the aforementioned arrangements. The applicant has in fact found that, to optimise control of an electrochemical reactor in this way, the necessary characteristic parameters must be measured under sensitivity, precision and response-time conditions that are not within the capability of the systems proposed above. In fact, it will be desirable to be able to use the information delivered by a hydrogen sensor more fully, so as to optimise the running and monitoring of an electrochemical reactor.

Thus, progress remains to be made in order to improve the understanding of the operation of electrochemical reactors, such as fuel cell stacks and electrolysers, by measurements capable of informing the operator, simply, frequently, rapidly and accurately, about key factors for the operation of electrochemical reactor systems, thus enabling him to act effectively, and preferably automatically, so as to maintain the yield, efficiency, safety and longevity of these systems.

SUMMARY OF THE INVENTION

In order to address these requirements, the present invention aims to provide a novel electrochemical reactor, especially for a fuel cell stack or an electrolyser, suitable for delivering information about characteristics of the internal operation of said reactor and, in particular, for monitoring and controlling this operation.

One subject of the invention is an electrochemical reactor, such as a fuel cell stack or an electrolyser, comprising: a stack of electrochemical cells, each of which comprises at least one electrode plate having one face in electrical contact with an electrolyte; at least one manifold connected to said face of each of the cells in an exchange circuit, for exchanging a gas with the outside of the stack; a sensor sensitive to the composition of said gas in the circuit; and at least one means for monitoring an operational condition of the reactor, for example for controlling the concentration of a gas according to the information delivered by said sensor. In accordance with the invention, this reactor is characterized in that the stack of cells and said manifold form a one-piece reactor body which comprises at least one chamber integrated into this body in communication with said manifold and in that said gas composition sensor is mounted in said one-piece body and comprises a sensitive unit directly exposed to the in situ concentration of a component of said gas in said chamber.

By virtue of this arrangement, a sensor for measuring the concentration of a gas used in the electrochemical cells of the reactor, especially a sensor for measuring the hydrogen concentration in the circuit connected to the anode of the electrochemical cells of the reactor, in a fuel cell stack, or connected to the cathode of electrochemical cells in an electrolyser, is intimately associated with the reaction conditions of said electrochemical cells, for example in terms of temperature, humidity conditions and compositions of the gas involved in the reaction cell stack. Furthermore, because it is mounted in a chamber which is directly integrated into the body formed by the block of cells and the duct that ensures gas exchange between these cells and said chamber, the flow rate of the gas forming the subject of the measurement is relatively low and close to that adopted in the cells. This is conducive to measurement precision. The proximity of the sensor to the stack where the reaction takes place is also a beneficial factor in shortening the response time.

According to a preferred embodiment for implementing the invention, said chamber is formed in a system plate that has a first face, in juxtaposition with an end cell of said stack, into which face said manifold opens on leaving the stack of cells through which it passes, and a second face, opposite the first face, which forms a support for fixing one or more elements of said gas circuit to the outside of said body. Thus, those portions of the gas circuit external to the one-piece body may be connected to the integrated chamber through this second face of the system plate to which control members for ensuring and controlling the flow of said gas are also fixed.

The assembly thus forms a compact assembly integrated into the core of which is the gas composition sensor, the temperature of which remains the same as that present within the cell stack. This constitutes a factor which by itself reduces the risk of condensation of the moisture in the air immediately surrounding the sensitive unit of the sensor; it will be seen later that such condensation may be deleterious in various situations. This factor makes it possible at least partly, to dispense with the sophisticated arrangements mentioned in the prior art cited for eliminating condensates. Moreover, the flow rate of the gas passing through the integrated chamber between the outside of the circuit and the manifold served by the cells is lower than in other portions of the gas circuit. This factor is conducive to measurement precision of the sensor. The immediate proximity also contributes to shortening its response time to compositional changes in the mixture.

In such an embodiment, it may also be opportune to mount said gas composition sensor in a wall, especially a side wall, of said system plate between said first and second faces. It may be advantageous to provide for this sensor to have, on the internal side of said wall, a hollow end piece enclosing a cavity which is in direct contact with the atmosphere of said chamber and in which said unit sensitive to the in situ concentration of a component of the gas in the chamber is housed. According to an advantageous embodiment, the cavity housing the sensitive unit in said hollow end piece is separated by a gas-tight and liquid-tight partition from another chamber formed in a portion of the sensor, which portion is mounted on the external side of said wall relative to said chamber, in which circuits of a unit for processing the signals transmitted by the sensitive unit are mounted. With this arrangement, provision may be made for said partition to be sealingly penetrated by conductors coming from the sensitive unit and to be resistant to a differential pressure between the cavity and the other chamber of said sensor. Thus, any risk of a hydrogen leak to the outside of the one-piece reactor body is dispelled by means of the arrangement of the sensor and, in particular, in the zone where the electrical connections of the sensor are collected. Moreover, the processing unit may thus be located in the immediate proximity of the sensitive unit mounted in the one-piece body. It will be understood that the interference of the signals that are output by the former unit can thus be very greatly reduced owing to the proximity of these two units. The precision of the system is therefore further improved thereby.

According to a preferred aspect for carrying out the invention, the gas concentration sensor in said circuit is a sensor suitable for delivering a signal that depends on the variations in thermal conductivity of the gas mixture in which it is immersed. It has been found in fact that this type of sensor is very suitable for being used directly inside the reactor and that it is particularly indicated for delivering, with a good time response, measurements of the gas concentration in mixtures frequently found in this type of reactor.

According to one technology, a sensor sensitive to the variations in thermal conductivity of the gas comprises a support provided in particular with a means of heating under controlled conditions and with a means for monitoring the temperature of this support. In the steady state, this temperature depends both on the inflow of heat from the heating means and the heat dissipation by the support into the ambient medium thereof. The heat dissipation is itself dependent, on the one hand, on the difference between the temperature of the support and that of the ambient medium and, on the other hand, on the thermal conductivity of the ambient gas mixture. The thermal conductivity is itself dependent on the nature of each of the gases present and on their concentration in the mixture.

Starting from these observations, the invention also relates to taking measurements of the in situ concentration of a gas, especially hydrogen, in an electrochemical reactor designed according to the abovementioned principles, not only just for the knowledge of the phenomena occurring within an electrochemical reactor for scientific purposes, but also as a means for regularly monitoring, on the basis of the interior of the reactor itself, its operation and its performance. In accordance with another aspect, the invention provides for these measurements to be used by various operational controls of this reactor, so as to warn, check, optimise and/or guarantee the operational safety thereof.

It was seen above that the operation of many electrochemical reactors is accompanied by the use and/or formation of liquids, especially water, which may pose a problem for maintaining, over the course of time, the integrity of a gas concentration sensor based on measuring the thermal conductivity of the gas mixture investigated.

Thus, according to one implementation aspect, a gas concentration sensor having a unit sensitive to the variations in conductivity of the ambient gas is used, in a gas circuit inside a reactor as defined above, by positioning said sensor in a place protected from its sensitive unit coming into contact with liquids, for example by using a water-repellent screen. For example, for this purpose it is possible to use a microporous membrane in order to form a gas-permeable water-repellent screen between the atmosphere of the chamber integrated into the one-piece body and the surface of the sensitive unit.

To take precise measurements of the in situ hydrogen concentration of the gas in which the sensor is immersed, it is possible to use the fact that this sensor, thus positioned and optionally protected, is sensitive to the variations in thermal conductivity of the gas in which it is immersed, this depending not only on the hydrogen concentration in the corresponding gas circuit but also on the water vapour concentration in said circuit. With a control device suitable for controlling several measurements of the conductivity in the environment of the sensitive unit on the basis of different heating temperatures, it is possible to determine the hydrogen concentration of the gas surrounding this sensor, corrected according to the water vapour content thereof.

It is also possible to use a known means for measuring the moisture content of the gas being monitored. The signal processing unit of the sensor is liable also to receive signals from the humidity sensor in order to correct the concentration measurements delivered by the sensitive unit according to the moisture content detected in the mixture. In practice, the system applies not only in a hydrogen gas circuit with a sensor which is sensitive to the concentration of hydrogen in said circuit, but also in an electrochemical reactor which includes a circuit for a gas mixture based on oxygen, either in the pure state or as a mixture, especially in air, in order to deliver information dependent on the hydrogen content of this gas mixture in the environment of the sensor.

In accordance with an advantageous application, the gas concentration measurement device according to the invention comprises a device for measuring the conductivity of a gas mixture in the reactor in order to determine, where appropriate, the presence of carbon dioxide and its concentration, these sometimes representing an important indication as to the good health or integrity of certain portions of the reactor, as will be seen later.

The reactor that has just been described applies advantageously to the construction of an improved fuel cell stack or an improved electrolyser. Thus, for example, by monitoring the hydrogen concentration in the hydrogen circuit of a fuel cell stack, it is possible to check, during operation, the hydrogen concentration of gas injected into the inlet of the electrochemical cells of a fuel cell stack. The output of the sensor, which is dependent on the hydrogen concentration, may for example be used by the control device for intermittently actuating a purge valve, so as to remove certain quantities of gas mixed with impurities from the hydrogen gas circuit so as to maintain the hydrogen concentration in said circuit above a predetermined level.

Moreover, it is advantageous to use the indications from such a sensor about the hydrogen concentration in the hydrogen circuit to prevent, during the phase of shutting down a fuel cell stack, the environment of the oxidation-sensitive elements from being in hydrogen starvation mode. Furthermore, subsequently, during periods when the stack is at rest, in which no energy is being produced, the sensor is advantageously maintained in standby mode so as to check whether the hydrogen concentration in the hydrogen gas circuit has dropped below a relatively low threshold, indicating that the environment of the oxidation-sensitive elements runs the risk of entering hydrogen starvation mode. If this is the case, the control unit causes additional amounts of hydrogen to be injected into the hydrogen circuit in order to re-establish the hydrogen concentration above said relatively low threshold. In practice, this threshold corresponds to the hydrogen concentration necessary for the anode potential of the electrolytic cells of the fuel cell stack to remain at the zero level.

A hydrogen concentration sensor may also be advantageously used to detect the diffusion of oxygen into the hydrogen because of a permeability defect between the two circuits, such as for example a hole in a polymer membrane used as electrolyte. If the oxygen circuit is equipped with such a sensor, the diffusion of hydrogen into the oxygen may also be detected so as to improve the safety of the system.

Finally, we have seen that the reactor according to the invention may be equipped with a sensor suitable for measuring the level of carbon dioxide ($CO_2$) in a mixture containing no hydrogen. This arrangement may be used in a fuel cell stack in which the aim is to check, for experimental reasons or for providing information redundancy, that the adjustments of the fuel cell stack are correct and that nowhere is a condition created that would result in inopportune oxidation of the portions of a stack that may be composed of carbon. This may for example apply to the catalyst support, which is produced based on fluffy powdered graphite.

The invention also relates to the application of the electrochemical reactor defined above for the construction of an electrolyser in which the hydrogen gas circuit comprises an integrated chamber which collects the gas outlets of each of the cathodes of the elementary cells of a stack of electrolytic cells. A hydrogen concentration sensor is mounted in the hydrogen circuit so as to deliver at least one signal dependent on the concentration of hydrogen produced in this circuit to the control unit in order to control the operation of the electrolyser. Of course, the same application is advantageously implemented in the oxygen production circuit. The indications received then serve for permanently monitoring the purity of the gases produced and for ensuring that the electrolyser operates under good safety conditions. The diffusion of hydrogen into the oxygen, and vice versa, due to poor impermeability between the two circuits, may for example be detected.

BRIEF DESCRIPTION OF THE DRAWINGS

Other features and advantages of the invention will emerge from the following description, which is given with reference to the appended drawings that show, by way of non-limiting examples, embodiments of the subject matter of the invention.

DESCRIPTION OF ONE OR MORE EXEMPLARY EMBODIMENTS

Figure 1:
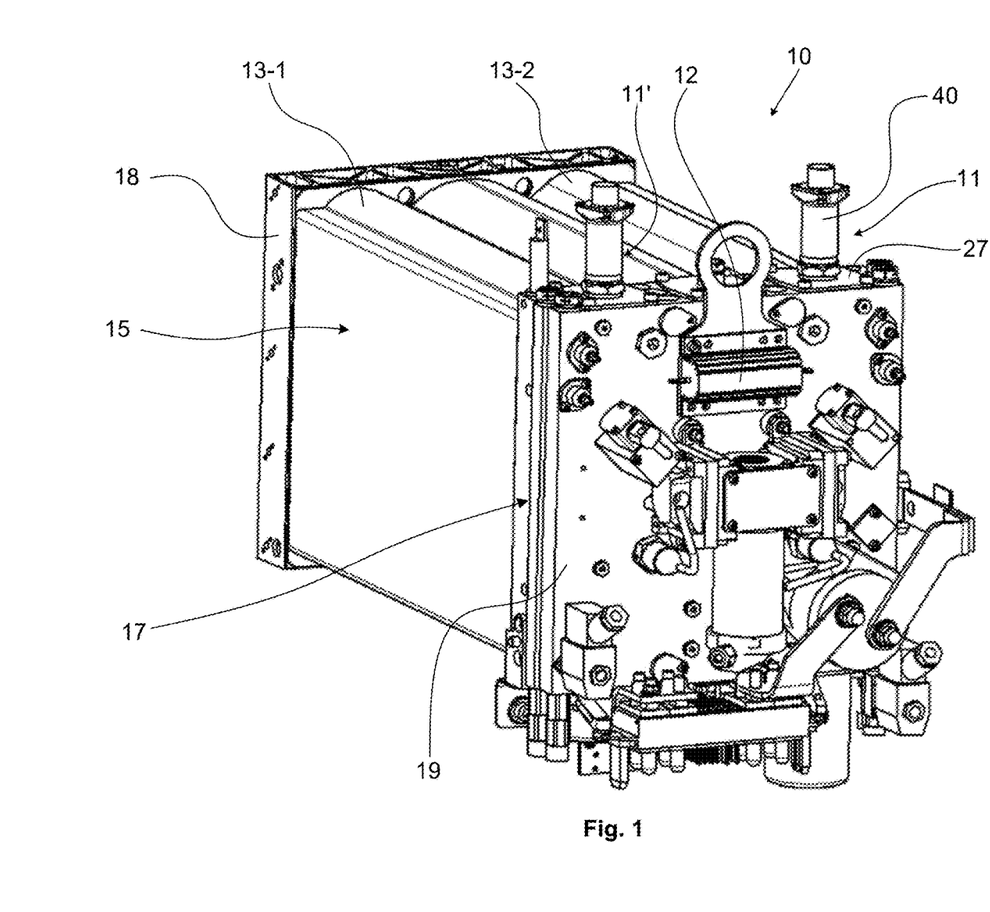
FIG. 1 is an overall perspective view of a fuel cell stack equipped with two hydrogen concentration sensors.

FIG. 1 shows the outside of a fuel cell stack 10. It comprises a one-piece body 15 of parallelepipedal general shape formed especially by a stack of electrochemical cells held together between two end plates 17 and 18, one (17) being called the system plate. This figure shows, at the top of the stack, the domed shapes 13-1 and 13-2 of two manifolds 24 and 24' formed by aligned openings within the cell stack, for supplying them with hydrogen and oxygen respectively, as will be explained later. The organisation of the fuel cell stack 10 in this example is of the type shown and described in the Applicant's Patent Application WO 2007/045416.

The system plate 17 has an external face 19 in which openings are made for communication with various functional members, such as pumps, valves, sensors, etc. These members, some of which are clearly seen in FIG. 1, may be fixed directly in this face 19 and are intended for making fluids circulate within the stack and exchanges with the outside. On the opposite side from the face 19, the system plate 17 has an internal face 29 in direct juxtaposition with an end cell of a stack of electrochemical cells that constitute the core of the system. The stack is penetrated by manifolds that connect together the channels which ensure flow of the fluids necessary for operation of the stack or of the reactor inside the stack. The manifolds of the stack run into openings, such as 26 in FIG. 2, which are provided in the end face 29 of the system plate 17. This system plate 17 is penetrated, through its thickness, by passages, chambers or manifolds (which may be cut from the material of the plate) that connect the manifolds of the stack 22 to the functional members in juxtaposition with the external face 19 of the system plate 17. The plate 17 therefore contributes to producing a compact and robust assembly for making at least most of the functional connections between the operating fluids of the reactor.

More specifically, the system plate 17 receives the inlets and outlets of two manifolds 24 and 44 (FIGS. 2 and 3) of a fuel gas circuit that conveys a mixture passing through the stacks of cells in order to supply one side (24) with hydrogen and to discharge (44) the unconsumed hydrogen at the outlet of each of the cells. Likewise, the system plate 17 houses oxygen inlet and outlet lines (not shown) for the manifolds, of an oxidant mixture circuit, which deliver oxygen to the cells. A system of lines (not shown) housed in this plate is provided for circulating a coolant, for cooling the stack of cells of the fuel cell. The space provided in the end plate also makes it possible to house therein, inter alia, the electrical connection members and the flow command and control members shown in the block diagram of FIG. 3, which will be described in detail later. As indicated above, the system plate 17 also serves for fixing and connecting measurement members, for example for measuring the pressure and temperature of the gases and for measuring the temperature of the coolant. In accordance with one feature of the invention, a device capable of providing information about the composition of at least one of the gas mixtures present inside the fuel cell stack 10 is also provided in the system plate 17. For this purpose, a hydrogen concentration sensor 11 comprises a sensitive unit 30 (visible in FIG. 2), the head of which opens into a chamber 20 constituting a portion of a hydrogen circuit provided inside this plate 17 and a processing unit 12, housed inside the sleeve C40 that projects out of the plate 17. The processing unit 12 that receives the signals coming from the sensitive unit 30 is designed to deliver measurements to the system that are dependent in particular on the in situ hydrogen concentration in the operational gas mixture or mixtures of the reactor. Apart from their role of providing the operator with direct information, these measurements make it possible, as will be explained later, to monitor the running of the reactor and, preferably, to automatically control its operation. In the following description, it will be explained in particular how the measurements produced are used for optimally controlling the intermittent purging of the hydrogen circuit in order to maintain a high purity level. The potential advantages of measuring the hydrogen concentration are also put to good use, but not limitingly, for preventing a critical hydrogen depletion of the atmosphere of the electrochemical cells in the case when the fuel cell stack is shut down, that is to say in the standby state.

Figure 2:
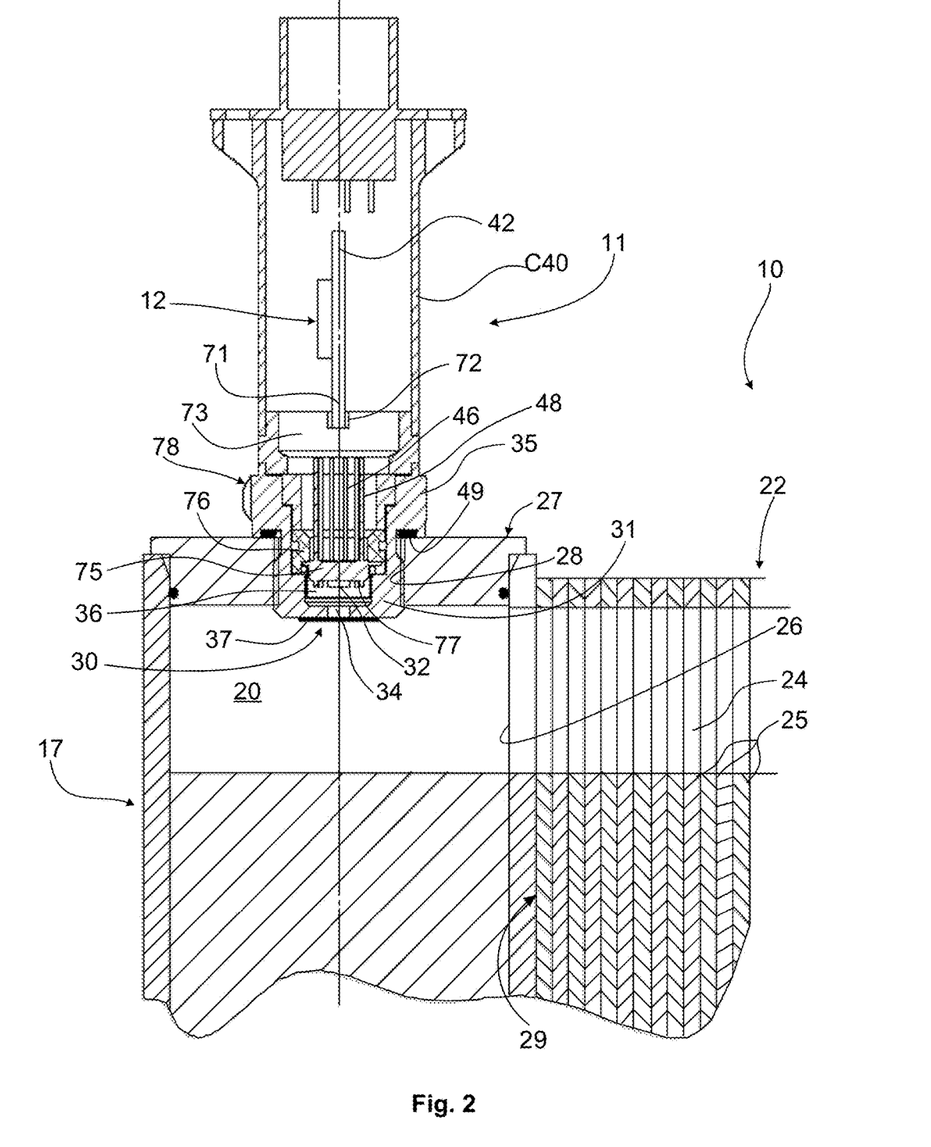
FIG. 2 is a cross-sectional view of implantation of one of the sensors of FIG. 1, which penetrates into the enclosure of the stack through the wall of an end plate of the electrochemical reactor.
Figure 3:
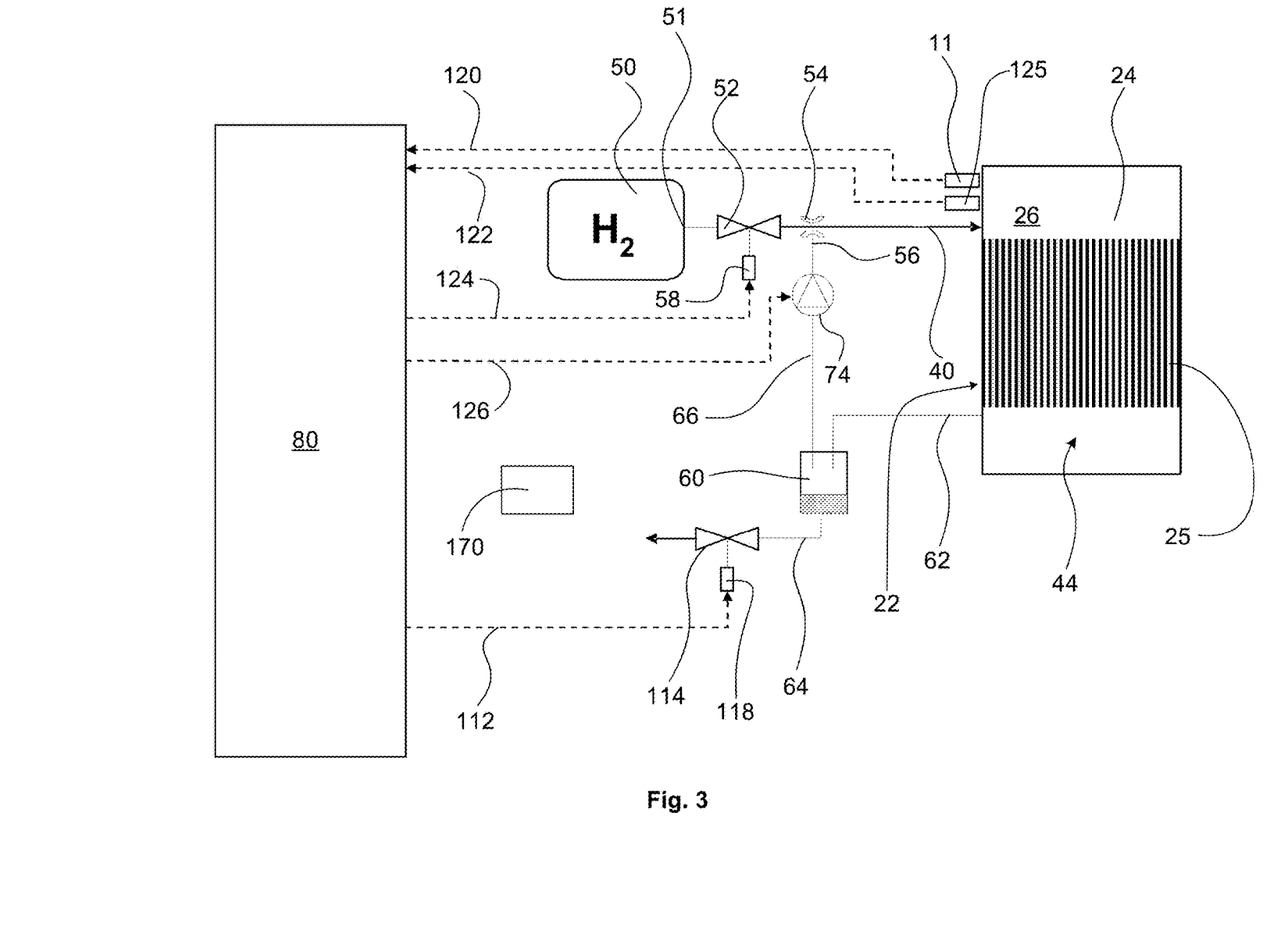
FIG. 3 is a block diagram showing the functional organisation of an example of a device for controlling the stack on the basis of measurements by a sensor mounted on the hydrogen supply inlet.

FIG. 2 shows a portion of the internal space of the system plate 17 mentioned above, which includes the chamber 20 for the intake of hydrogen coming from a tank 50 (which can be seen in FIG. 3). On the opposite side from the external end face 19 of the plate 17, this chamber is bounded by a stack of cells 25 where the electrochemical reaction takes place. The adjacent cells are passed through by a hydrogen gas supply manifold 24, which takes its source into the chamber 20 via an inlet 26.

Provided in the upper lateral face 27 of the system plate 17 is a drillhole 28 through which a hollow end-piece 31 passes with an appropriate pressurised-gas-tight seal 49, inside which end-piece the head of the sensitive unit 30 is housed and protected, at one end of the hydrogen concentration sensor body 11, also visible in FIG. 1. The head of the sensitive unit 30 comprises a circuit wafer 32, constituting a sensitive unit, which is mounted in a chamber 36 provided in the lower portion of the end-piece 31. The chamber 36 communicates with the chamber 20 in the reactor via a channel 34 drilled in the end wall of the hollow end-piece 31. The wafer 32 of the sensitive unit, one face of which is turned towards the outlet of the channel 34 in the chamber 36, is in direct contact with the atmosphere of the chamber 20 via the channel 34. In accordance with an important aspect, a filter 37 is placed on the inlet of the channel 34 in the chamber 36 in order to isolate the wafer 32 from any contact with liquid water that could be mixed with the gases of the chamber 20, for reasons that will appear later. The filter 37 is made of a material which is permeable to the gases but impermeable to liquid water. The commercially available woven material with the brand name "GORE-TEX" (registered trademark) is known for example for its capability in such a use. The material essentially consists of a synthetic fabric of Teflon (registered trademark) yarns.

On the opposite side from the hollow end-piece 31, the body of the hydrogen concentration sensor 11 has a cylindrical sleeve 48 that projects from the external lateral wall 27 of the plate 17, from a hollow thrust flange 35 fixed to this wall 27. The processing unit 12 is formed by a circuit mounted on a printed circuit board 42, the contact pins of which at an end 71 are plugged into a connector 72 in a connection housing 78 mounted on a support 73 in the internal space of the cylindrical sleeve 48. A set of electrical conductors 46 connected at one end in the connection housing 78 pass through the interior of the cylindrical sleeve 48 and the hollow interior of the flange 35 so as to terminate in an insulating partitioning plug 75 that closes off the upper portion of the chamber 36 at the end of the end-piece of the sensor 31. The plug 75 is sealingly fixed to the inside of a sleeve 76 inside the hollow end-piece 31 so as to be able to withstand the pressure of the gas in the chamber 36, knowing that on its upper face, it is subjected to the ambient pressure in the space where the fuel cell stack is installed. In addition, each conductor 46 is electrically connected through this partitioning plug 75 to a respective contact pad 77 formed on the lower face of the plug 75 in the chamber 34. Also bonded to this lower face is the wafer 32 of the sensitive unit 30 of the sensor, with its sensitive face turned towards the chamber 34.

Each output pad of the wafer 32 of sensitive circuits is connected to a respective contact pad 77 via an electrical connection wire, too fine to be visible in FIG. 2, also called a bonding wire, in order to establish the electrical link between the sensitive unit 30 and the processing unit 12 via the electrical conductors 46. The electrical connections or bondings are produced so as to withstand the corrosive action of the atmosphere present within the reactor. Gold conductors are preferable to the aluminium conductors normally used for electrical bonding conductors in industrial sensors. Alternatively, a protective layer covers the conducting portions. This constraint is due to the nature of the atmosphere encountered in redox electrochemical reactors. The electrical conductors 46 pass through the plug 75 in glass beads so as to avoid impairing the sealing thereof, so that the gas contained in the chamber 20 does not escape.

Provided with all these precautions, the hydrogen concentration sensor 11, with its sensitive unit and wafer 30, 32 and the processing unit 12, is operational for carrying out, in situ, measurements of physical parameters that characterize the properties of the gas contained in the chamber 20 and especially its hydrogen content, which is a parameter of paramount importance for the operation of the fuel cell stack. It turns out that performing in situ measurements continuously or almost continuously inside an electrochemical reactor is made operationally feasible by integrating into the reactor a sensor which is sensitive to the thermal conductivity of the gas in which its sensitive unit and wafer 30, 32 is immersed. Measuring this parameter proves to be particularly suitable for detecting hydrogen contents in the atmosphere of an electrochemical reactor such as a fuel cell stack. It is known in fact that the thermal conductivity of hydrogen is the highest in nature as regards gases. This property makes it easier to detect hydrogen among other gases but especially oxygen and nitrogen with which it is liable to be found mixed in certain environments. It will be recalled that, to take this type of measurement, the sensor includes a wafer of material which is heated, for example by means of a resistor through which an electrical current flows. By measuring the electrical power devoted to maintaining a defined temperature, it is possible to determine the power dissipated by the loss of heat in the atmosphere in which the wafer is immersed and to deduce therefrom the thermal conductivity of the surrounding gas.

Figure 4:
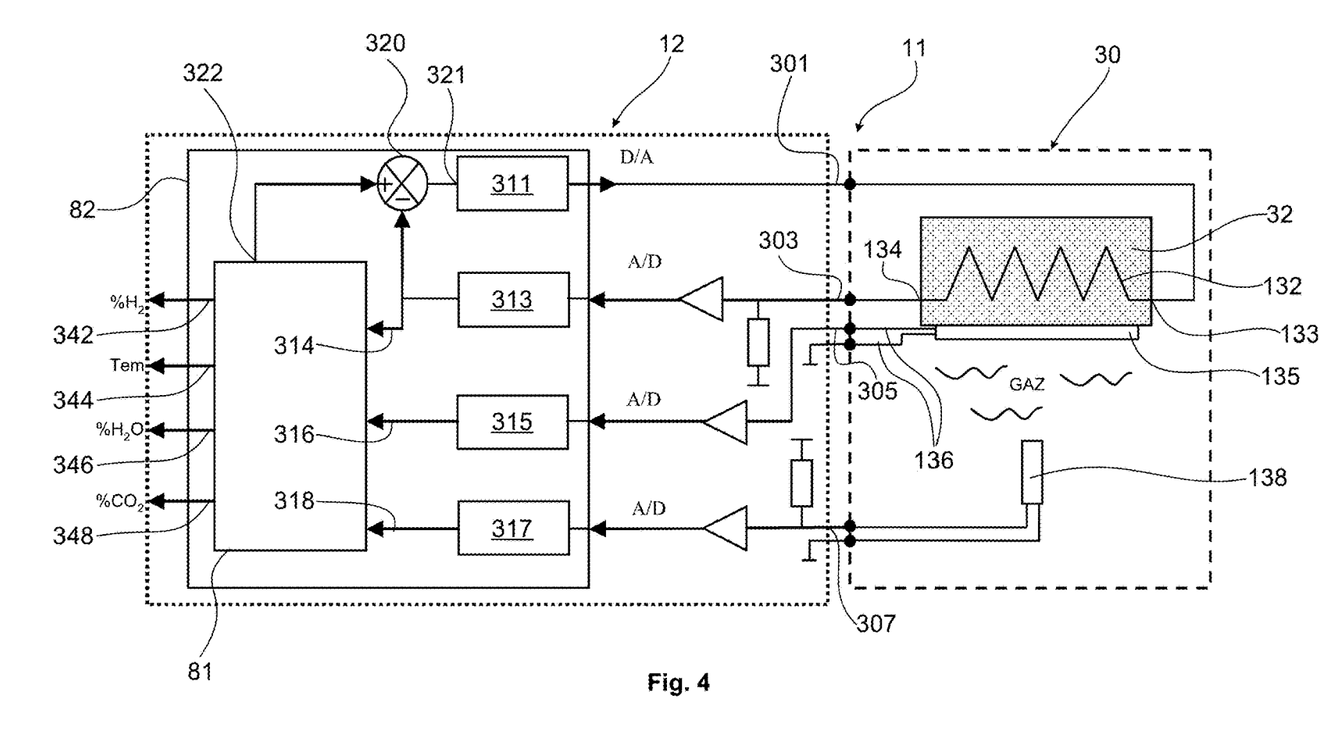
FIG. 4 is a highly simplified diagram of the construction of a sensor for measuring the hydrogen concentration of a gas mixture, together with its processing electronics for an electrochemical reactor, in accordance with the invention.

As shown very schematically in FIG. 4, the wafer 32 of sensitive circuits of the hydrogen concentration sensor 11 is composed of a substrate in the form of a plate or film, for example silicon substrate. The substrate is covered with an electrical resistance heating element 132, whether integrated or deposited, this element being supplied through supply terminals 133 and 134 by a current source controlled by the processing unit 12. One of the faces of the wafer 32 has a temperature sensor 135, for example formed by what is called a PT100 thermoresistive layer, this sensor being connected via a set of conductors 136 to the processing unit 12 in order to deliver the signals corresponding to the instantaneous temperature of the wafer of the sensitive unit 32, through the combined action of heating and heat dissipation in the ambient gas. Furthermore, the hydrogen concentration sensor 11 incorporates a temperature probe 138, for example a PT100 probe, in order to determine the temperature of the ambient gas. The physical portion of such sensors is for example described in the patent documents EP 0 291 462 B1 of 11 May 1988 and EP 0 501 089 A1 of 25 Feb. 1991.

It may be seen in FIG. 4 that the processing unit 12 of the hydrogen concentration sensor 11 includes a digital module 82 connected via four signal lines to the sensitive unit 32. The digital module 82, shown schematically in FIG. 4, is a simplified representation of the functions of an algorithm installed in a microcontroller and comprises a module 81 for computing the output quantities from the hydrogen concentration sensor 11 delivered to the control unit 80 of the fuel cell stack, as shown schematically in FIG. 3.

The first line 301 carrying the output of the processing unit 12 controls, via a digital/analogue converter, the voltage applied to the heating resistance element 132 of the sensor of the wafer 32. The voltage is controlled using a heating power regulator 311 in the control unit 80.

The second line 303 receives the voltage signal, which is the image of the current flowing through the heating resistance element 132. This information is converted by an A/D (analogue/digital) converter at the input of the processing unit 12 to be used by a control circuit 313 for controlling the heating power actually dissipated in the resistance element 132 of the hydrogen concentration sensor 11. As may be seen in the diagram, this information, sent to the comparator 320 in the digital module 82, is compared with a setpoint value produced as output 322 of the computing module 81. In the digital module 82, the product of the comparison between these two quantities controls the input 321 of the heating power regulator 311. The heating of the wafer 32 of the sensitive unit 30 is therefore generated via a digital feedback loop on the basis of the heating power setpoint displayed at each instant at the output 322 of the digital module 82. Better measurement precision is achieved with constant heating power.

The third line 305 enables the analogue signal output by the temperature sensor 135 of the wafer 32 to be received at an input of the processing unit 12. After analogue/digital conversion, this signal is used by a temperature-computing unit 315 in the digital module 82, which in turn supplies the computing module 81 with this information.

Finally, the fourth line 307 corresponds to an input of the processing unit 12 that receives the output voltage from the temperature probe 138 (ambient temperature) and, after analogue/digital conversion, transmits the information to a temperature-computing unit 317 in the digital module so as to display it at the input of the computing module 81.

The computing module 81, which therefore receives, on its inputs 314, 316 and 318, the information about the effective sensor heating power, the temperature of the wafer 32 and the ambient temperature of the temperature probe 138, makes it possible to determine, in the following order, the measurements of: the measured hydrogen content, the ambient temperature, the percentage water vapour content (as obtained by the technique described below or from a specific humidity sensor, not shown) and the carbon dioxide ($CO_2$) content at the four outputs 342, 344, 346 and 348, as will be explained below.

In certain cases, the sensor may be directly calibrated as a function of the hydrogen concentration of a gaseous medium. When another component is present in the gas mixture, a second measurement may prove necessary. Thus, in the presence of water vapour, it is possible to use a technique in which a second measurement is carried out at a different heating power, which leads to a different equilibrium temperature. Since the conductivity of water vapour has a different temperature dependence from that of hydrogen, the combination of the two measurements at different temperatures makes it possible to calculate the water vapour percentage at the same time as the actual hydrogen content of the wet gas. As indicated previously, another solution consists in using a direct specific measurement of the water vapour content by a sensor of known type, for example one operating on capacitive measurement principle, incorporated into the sensitive unit 30.

It should be noted that, with the technique mentioned, it is not easy to determine these concentrations if an additional gas is present in the mixture. Very fortunately, it turns out that, in the application in question, hydrogen and carbon dioxide are not liable to coexist. This is because in an electrochemical reactor of the current technology, which involves redox reactions, it is precisely the absence of hydrogen which is at the origin of corrosion phenomena leading to the production of carbon dioxide, the thermal conductivity of which is markedly lower than that of air, i.e. 16.4 mW/Km at 25° C. It is therefore possible to employ a similar technique for measuring the presence of carbon dioxide instead of hydrogen.

Returning to the actual reactor structure, FIG. 3 shows schematically a stack 22 of cells 25 crossed by the manifold 24, the inlet 26 of which receives from the chamber 20 the pressurised hydrogen delivered by an inlet line 40. The manifold 44 also crosses the stack 22 for discharging the moisture-laden hydrogen mixture which is collected at the outlet of each electrochemical cell 25 after having been brought into reaction contact with the components of each cell on the anode side.

Figure 5:
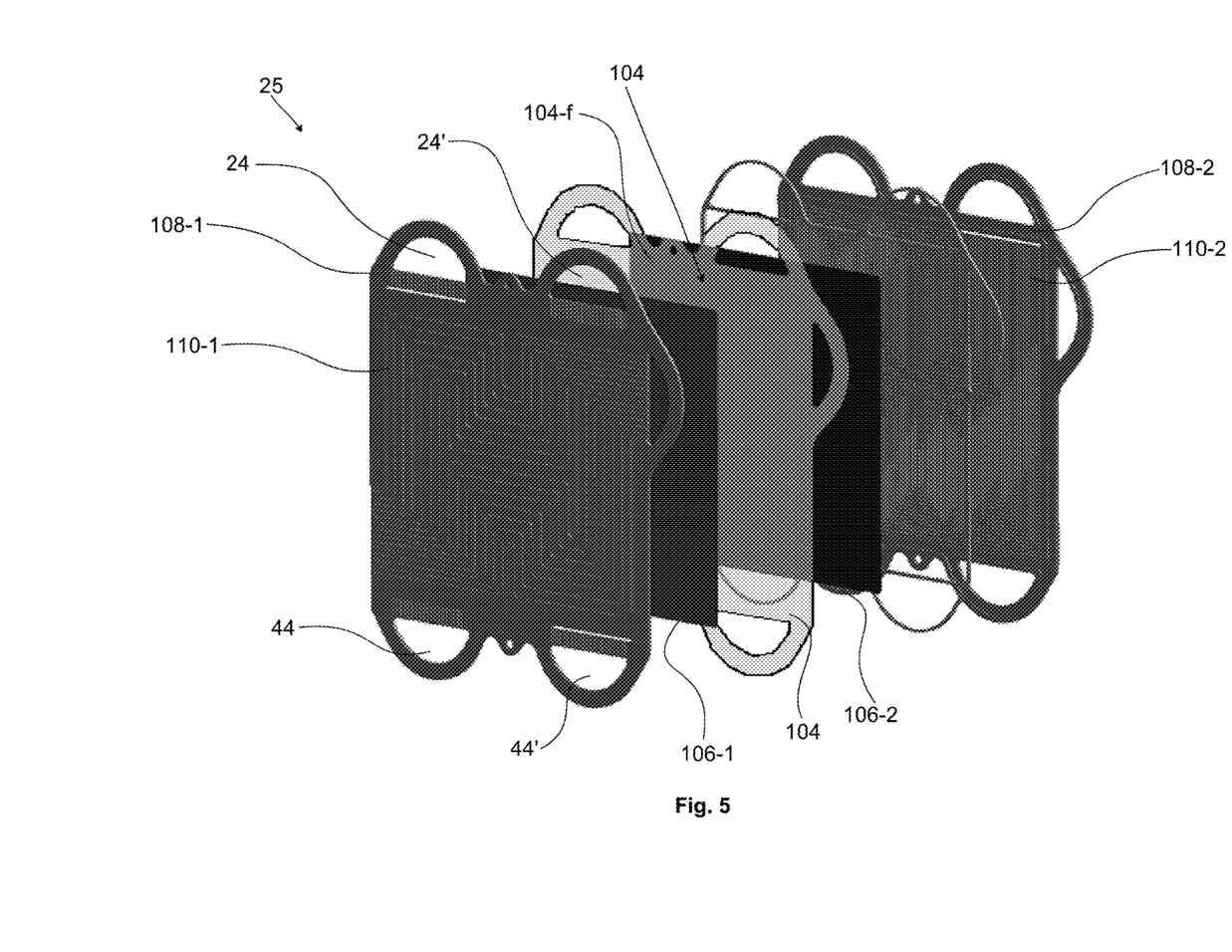
FIG. 5 is a diagram of one embodiment of an electrochemical cell in a fuel cell stack.

Referring now to FIG. 5, this shows an exploded view of an electrochemical cell for a reactor, such as that of the fuel cell stack 10 of FIG. 1. Each electrolytic cell 25 of the stack 22 is formed on the basis of a solid electrolyte membrane 104 consisting for example of a polymeric material developed and sold by DuPont under the name Nafion®. This membrane is permanently humidified by the water conveyed via the gas and also by the water produced by the reaction in the cell. Each face 104-$f$ of this membrane is in intimate contact with a catalyst consisting for example of a thin platinum-impregnated graphite layer (not shown). On each side, the membrane thus coated is in close contact with a gas diffusion layer, 106-1 and 106-2 respectively.

The assembly is compressed between two metal plates, 108-1 and 108-2, respectively, called bipolar plates, each being responsible for bringing one of the gases of the reaction into contact with the gas diffusion layers via a system of channels 110-1 and 110-2 respectively. These channels are etched in one of the faces of each plate so as to force the gas to irrigate the catalyst along a very long sinuous path. It should be recalled here that the other face of each plate is also etched so as to form a network of channels for the circulation of a coolant in each cell. On the anode side of the electrochemical cell, said channel or channels of the hydrogen gas circuit open into an inlet on the side with the manifold 24, supplied under pressure, and terminating in an outlet in the manifold 44, which therefore conveys the gas not absorbed by the reaction in contact with the membrane 104 during their passage in the cell (and likewise for the manifolds 24' and 44' for the other gas, i.e. oxygen gas). Each metal plate 108-1 also constitutes, electrically, an anode plate that collects the electrons coming from the electrochemical reaction, the electrons being conducted via the suitable conductors to the outlet of the fuel cell stack and where appropriate to an external user load. Each anode plate of a cell is applied against a cathode plate 108-2 of the adjacent cell, thus electrically connecting these two cells in series so as to obtain a sufficient voltage at the outlet of the cell stack. Thus, on the other side of each anode plate 108-1, the electrochemical cell comprises a metal cathode plate 108-2 for supplying the oxidant gas to the cell placed in intimate contact with the catalyst. This cathode plate is electrically connected to the cathode outlet of the stack.

Returning to FIG. 3, a tank 50 of pure or almost pure pressurized hydrogen fuel includes an on/off output valve 51. The hydrogen output pressure is controlled by a proportional solenoid valve 52, which follows the valve 51, in order to expand the gas down to a finely controlled pressure level. This valve is connected to the line 40 via a venturi 54. The expanded gas is sent into the electrochemical cells of the stack, where it undergoes a large pressure drop. It should be noted that the hydrogen flow rate is not controlled by the system. In operation the fuel cell stack "takes" exactly the amount of hydrogen that it requires to produce the stream drawn. However, it is necessary to ensure that the gas is delivered at a sufficient pressure. It is the role of the proportional solenoid valve 52 to perform this pressure regulation. As a variant, it would be possible to ensure that the pressure is regulated as a function of the hydrogen concentration information measured by the hydrogen concentration sensor 11. The hydrogen not consumed in each cell 25, together with the non-hydrogen impurities present at the input into the cells, is taken up by the manifold 44 in order to be collected into an output line 62. This line opens into a condenser 60 where some of the water vapour contained in these gases liquefies. The water may be extracted at the base of the condenser 60 and discharged out of the fuel cell, under the effect of the pressure within the hydrogen circuit, via an output line 64 controlled by a solenoid valve 114 activated by an actuator 118 placed under the control of a computer control unit 80 assigned to controlling the fuel cell.

The gases coming from the manifold 44, after they have been dehumidified in the condenser 60, are then recovered from the condenser 60 via a line 66 which brings them to a return or recirculation pump 74. The latter is connected to a secondary intake 56 of the venturi 54 by means of which the gases taken up may be reinjected into the line 40 to be mixed with the stream of fresh gas coming from the tank 50.

The cycle continues until the moment when the solenoid valve 114 triggers a purge phase, which results in a portion of the gas from the condenser 60 being discharged rather than recycled, in order to reduce the amount of non-hydrogen gas impurities that tend to accumulate owing to the recycling into the gas mixture present in the hydrogen circuit formed by the line 40, the output line 62, the line 66, the secondary intake 56, the manifolds 24 and 44 and the channels for supplying the electrolytic membrane 104 in each cell of the stack 22. As regards the oxygen circuit (not shown), there is generally no recycling when the fuel cell uses air in the oxidant circuit. If the oxygen circuit is supplied with pure oxygen, a similar circuit to that shown in FIG. 3 for the hydrogen may be provided with recycling and an automatic purge system, but with no possibility of using a gas concentration sensor based on thermal conductivity because the conductivities of the gases liable to be present in the gas mixture are too close together.

To complete the description of the system illustrated by FIG. 3, the hydrogen concentration sensor 11 is connected to the control unit 80 via the outputs 342, 344, 346 and 348 of FIG. 4, diagrammatically grouped together by the control line 120 in FIG. 3. For high precision, the electronic processing unit 12 is placed very close to the sensitive unit of the sensor and mounted in the same sensor body fixed in the wall of the chamber 20, as shown in FIG. 2. The measurements of the gas pressure inside the manifold 24, delivered by a pressure sensor 125 placed alongside the hydrogen concentration sensor 11 in the external wall of the manifold 24, is sent to the control unit 80 via another control line 122. A control line 124 coming from the control unit 80 serves to control an actuator 58 for activating the proportional pressure-regulating solenoid valve 52. Finally, the control unit also controls a control line 126 connected to the motor of the pump 74 for controlling the rotation speed of said pump under the control of the measurements delivered in particular by the sensors 11 and 125.

In the electrochemical reactor industry, especially the fuel cell industry, it is customary to employ very pure gases, at least in the case of the hydrogen oxidant. However, the few traces of impurities in the tank 50 (FIG. 3) containing the gas accumulate as it is recirculated into the elements of the fuel cell stack with supplies of fresh gas. Thus, for example, in a fuel cell stack consuming, under normal temperature and pressure conditions, 100 liters per minute of a hydrogen gas initially containing 0.5% of an impurity consisting of another gas, a normal half-liter of non-hydrogen impurity enters the fuel supply circuit of the fuel cell stack every minute. The impurity may rapidly accumulate. It is therefore necessary to maintain the purity level above the high threshold by purging the hydrogen output circuit at certain intervals of relatively frequent fixed duration, and therefore extracting quantities of gas possibly greater than that strictly justified by the requirements.

In accordance with one of the aspects of the invention, it is advantageous to have available a technique for measuring the hydrogen content appropriate to the circumstances of the electrochemical reactors in order to control the purging of the hydrogen circuit according to the measurements of the pure hydrogen concentration performed by the hydrogen concentration sensor 11 in the hydrogen gas circuit. When during operation the concentration monitored reaches a predetermined level indicating that the % hydrogen gas content in the hydrogen gas circuit drops below a predetermined threshold, the control unit 80 acts on the control 115 of the purging solenoid valve 114 in order to modify the purging conditions of the circuit.

The control unit 80 in this example is operationally programmed to monitor the hydrogen concentration of the manifold 24 relative to a lower threshold that corresponds to a non-hydrogen impurity content considered as limit for proper operation of the fuel cell. Thus, following currently standard practice, if the hydrogen concentration is greater than 99%, the purging solenoid valve 114 is opened with a minimum frequency and for a minimum duration so as to remove any excess water without wasting hydrogen. However, when the control unit detects that this hydrogen content drops below 99% based on the information transmitted by the hydrogen concentration sensor 11, the frequency with which the purging solenoid valve 114 on the extraction output line 64 of the condenser 60 is opened is increased. As soon as the hydrogen concentration detected by the sensor between two purges rises, because of replenishment of the gas contained in the circuit, the control unit again reduces the frequency with which the purging solenoid valve 114 is opened. Of course, it is possible to use the hydrogen concentration sensor 11 for controlling the purging functions differently, for example by triggering the purge at regular intervals and by varying the opening duration.

An advantageous embodiment has been described here of a system for purging a main gas circuit in the fuel cell in order to keep the operation thereof close to the optimum, by controlling the circuit purging procedure according to the measurements carried out in situ either continuously or almost continuously, depending on the requirement, by a hydrogen concentration sensor 11 based on thermal conductivity, the implantation of which was described in conjunction with FIG. 2. It will be understood that this arrangement makes it possible to optimise the consumption of pure hydrogen at the inlet of the fuel cell stack according to the actual pollution levels of the oxidant gas stored in the tank or in the atmosphere of the reactor itself. In fact, contrary to what is generally recommended, this arrangement finally offers the possibility of supplying the fuel cell stack with hydrogen of lower purity without the risk of impairing it. Since the cost of producing the gases varies very greatly with the desired purity, the fact that hydrogen of lower purity can be used is a considerable economic advantage promoting the development of fuel cell stacks.

According to another aspect, a gas concentration sensor, such as 11 described above, is used in the fuel cell possibly concomitantly with the purge control function that has just been described, in order to maintain the integrity of the system during shut-down and the rest or storage period that follows. Specifically, the control unit 80 is programmed to continue monitoring the hydrogen content of the fuel gas circuit on the basis of controlled periodic measurements by the hydrogen concentration sensor 11 and to check that hydrogen is always present. Experience with fuel cell stacks operating on the model described here shows in fact that certain elements of the stack, especially the elements containing carbon, such as the graphite-based catalyst supports, must be maintained at a potential close, or equal, to zero. This condition is met as long as these elements are surrounded with hydrogen, the electrochemical potential of which is zero. Otherwise, the electrochemical potential rises to about 1 volt because of the oxygen that slowly, but irremediably, penetrates the environment of the electrochemical cells of a fuel cell stored in air. This presence is liable to create an electrical condition conducive to the oxidation of the graphite elements and thus destroy a part vital to the operation of the system.

The applicant has been able to determine that a thermal conductivity sensor such as 11 also lends itself very well to detecting a relatively low concentration (a few %) threshold to be respected in the hydrogen circuit of the fuel cell in order to prevent the environment of the oxidation-sensitive elements entering into hydrogen starvation over the duration of the fuel cell shut-down phase or subsequently during the rest periods. To prevent this condition, the shut-down procedure may advantageously be carried out according to the hydrogen concentration information delivered by the hydrogen concentration sensor 11. During the rest phase that follows shut-down, the hydrogen concentration sensor 11 is periodically woken so as to carry out a measurement. For example when the control unit detects the imminence of such a condition in the information delivered by the hydrogen concentration sensor 11, it triggers, via the control line 124, the opening of the pure-hydrogen intake valve in order to re-establish the hydrogen content in the fuel circuit of the reactor, upon shut-down or in the storage state, at a programmed level.

According to an alternative embodiment, the output line 64 leaving the condenser 60 is connected to a small buffer tank 170 which is normally maintained at the pressure of the fuel gas discharged from the fuel cell during purges. When the fuel cell is in shut-down mode or in the standby state, the internal pressure in the hydrogen circuit is lowered down to a pressure generally close to atmospheric pressure. When the control unit 80 actuates the actuator 115 for temporarily opening the solenoid valve 114, the pressure difference enables a certain amount of gas from the small buffer tank 170 to pass through the condenser 60 into the hydrogen circuit in order to re-establish the hydrogen content at an appropriate level. The applicant has even found that when the output line 64 extends sufficiently far away from the solenoid valve 114, it is capable by itself of constituting a buffer reserve sufficient to re-establish the desired minimum hydrogen content when the solenoid valve 114 is made to open.

In accordance with one possible aspect of the control of the fuel cell using a sensor such as 11, the control unit is programmed in this example to generate a measurement of the water vapour content of the gases entering the manifold 24 of the hydrogen circuit. It will be recalled that the gas entering this circuit via the input line 40 is produced by a mixture of pure dry hydrogen gas coming from the tank 50 and a gas recirculated via the venturi, possibly assisted by the pump 71. Knowing that water is one of the products of the electrochemical reaction in the fuel cell, the gas leaving the condenser in the line 66 is saturated with moisture. The moisture content of the gas entering the inlet 26 of the manifold 24 may therefore be regulated by the metering of the mixture. This parameter is important for the operation of the fuel cell since the solid membrane electrolyte, which is the site of the electrochemical reaction, must remain wet in order to be able to operate optimally. As a consequence, under the control of the processing unit 12, the hydrogen concentration sensor 11 carries out first and second conductivity measurements at temperature differences $T_1$ and $T_2$ relative to the ambient temperature, from which measurements the conductivity of the pure hydrogen and the water vapour content may be determined by the control unit. Alternatively, it was seen that the water vapour content may be delivered by another specific sensor, for example a capacitive sensor. In each case, the control unit 80 adjusts the speed of the recirculating pump so as to maintain the moisture content within a predetermined range favourable to correct operation of the solid electrolyte membrane while still maintaining the hydrogen content of the gas entering the manifold 24 at a suitable level.

It may be advantageous to use two gas concentration sensors such as 11 in the fuel cell stack 10. FIG. 1 shows, in addition to the hydrogen concentration sensor 11 at the inlet of the hydrogen fuel circuit, a second hydrogen concentration sensor 11' at the inlet of the oxidant circuit delivering oxygen (or pressurized air), which may be identical to the hydrogen concentration sensor 11. For the measurement of the moisture content of the gas sent to the cathode, there may be an advantage in taking the measurement from the oxygen circuit using the hydrogen concentration sensor 11'. The circulating gas picks up more water on the oxygen circuit (cathode circuit) side than on the hydrogen circuit (anode circuit) side.

Finally, according to a welcome application, a hydrogen concentration sensor such as 11 may make it possible, where appropriate, to detect the onset of corrosion by the presence of carbon dioxide in the oxygen circuit. It is known that the thermal conductivity of carbon dioxide is low compared to that of many common gases, especially nitrogen and oxygen, the conductivities of which are very similar, and, of course, even lower than that of hydrogen. It may be advantageous to use two gas concentration sensors such as 11 in the fuel cell stack 10. FIG. 1 shows, in addition to the hydrogen concentration sensor 11 at the inlet of the hydrogen fuel circuit, a second hydrogen concentration sensor 11' at the inlet of the oxidant circuit delivering oxygen (or pressurized air), which may be identical to the hydrogen concentration sensor 11. To detect a defect in the permeability between the two circuits, such as, for example a hole in a membrane, the sensor 11 enables the presence of oxygen in the hydrogen to be detected while the sensor 11' enables the presence of hydrogen in the oxygen to be detected. Since the diffusion of one gas into the other is liable to compromise safety, it is advantageous to provide this information redundancy.

Finally, according to a welcome application, a hydrogen concentration sensor such as 11 may make it possible, where appropriate, to detect the onset of corrosion by the presence of carbon dioxide in the oxygen circuit. It is known that the thermal conductivity of carbon dioxide is low compared to that of many common gases, especially nitrogen and oxygen, the conductivities of which are very similar, and, of course, low compared to that of hydrogen. Knowing the thermal conductivity of these gases, it is easy to program the hydrogen concentration sensor 11 or 11' so as to calculate the carbon dioxide content of the gas mixture and thus detect the presence of $CO_2$ even in small amounts on the basis of the measurements by the hydrogen concentration sensor.

On the anode side, the flow of a gas having a high hydrogen concentration implies a zero potential for the parts in contact and therefore avoids the risk of corrosion as long as there is enough hydrogen. Consequently, if the abovementioned precautions are taken when shutting down the fuel cell, the corrosion risks are properly under control. The additional capability offered by the hydrogen concentration sensor 11 or 11' in this case therefore applies most particularly in the study and development phases for a fuel cell system. However, it does represent an appreciable safety auxiliary.

Figure 6:
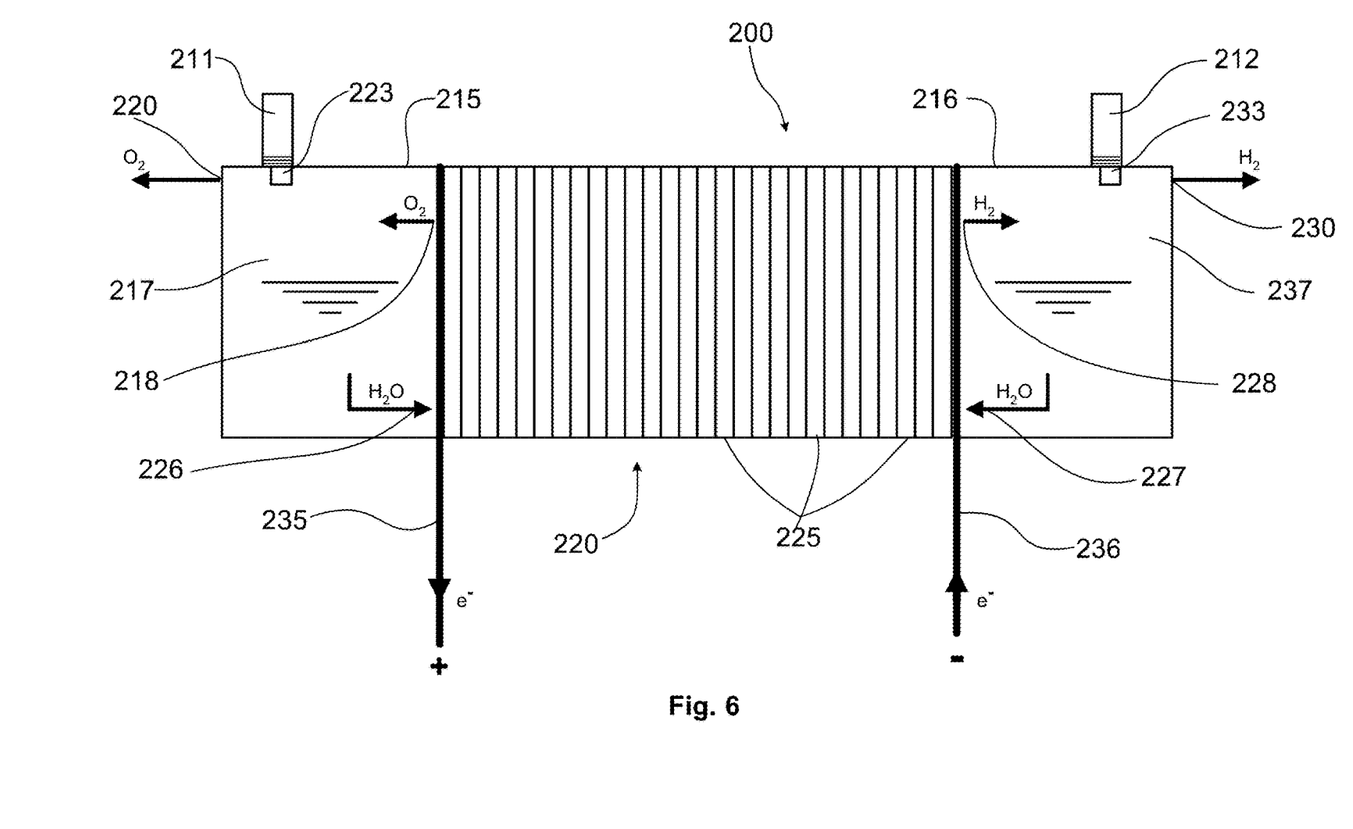
FIG. 6 is a simplified diagram of an electrolyser equipped with a control device in accordance with the principle of the invention.

FIG. 6 shows very schematically an industrial electrolysis apparatus that can be used for manufacturing hydrogen and oxygen from an electrical supply. For this type of application, it is important to ensure that the gases produced are of good quality. Not only is it important for the gases produced to be as pure as possible in view of the intended applications, but also, owing to the very nature of these gases, such mixtures may be highly hazardous to the safety of property and operators. In this type of installation, the hydrogen circuit includes a manifold that connects all the outlets of the miniature gas channels of the cathode plates in order to join them to the hydrogen outlet of the stack. Likewise, an oxygen manifold connects the oxygen outlets of the plates of the elementary cells of the stack to an outlet external to the installation. In each circuit, the gases produced may be of higher or lower purity as a portion of these gases produced diffuses through the electrolyte before being collected. Moreover, the presence of leaks may cause hydrogen and oxygen exchange between the circuits, which could, if not detected in time, run serious risks of a hydrogen/oxygen mixture exploding.

According to this aspect of the invention (FIG. 6), two hydrogen concentration sensors based on thermal conductivity are used, one 211 in a chamber 217 within a system end plate 215, integrated into a reactor body formed by a stack of cells with the oxygen output manifold (not visible in the figure) on the anode side, and the other 212, on the cathode side, in a chamber 237 within a system end plate 216 integrated with said body at the outlet of a hydrogen manifold (not visible). One of these sensors therefore measures small hydrogen gas concentrations while the other one measures high concentrations. One advantage here lies in the possibility of measuring the quality of gases produced directly in the electrolyser without having to take off gas samples intermittently or continuously.

In FIG. 6, an electrolyser 200 comprises a stack 220 of elementary electrochemical cells 225. They are supplied with water, which is decomposed into hydrogen and oxygen, in the presence of a catalyst, through the effect of the electrical current flowing therethrough. The stack 220 is clamped between two system end plates, one 215 of which closes off a separation enclosure, the upper part of which forms a chamber 217 that receives the oxygen coming from the stack of cells 225. The other plate 216 closes off a separation enclosure, the upper part of which forms a chamber 237 that receives the hydrogen coming from the reaction in the cells 225. In each of the plates, the bottom part of the separation enclosure opens into the inlet, 226 and 227 respectively, of a manifold (not visible) for supplying the cells 225 inside the stack 220 with water.

The oxygen collected in the separation plate 215 coming from the duct 218 is separated from the water contained in the circuit, the water collecting at the bottom of the separation enclosure 217 to be recycled into the electrolyser at the inlet 226. The chamber 217 in the upper part of the separation enclosure 217 contains a tap 220 for drawing off the oxygen produced. Opening into the upper part of this chamber 217 is the sensitive unit 223 of the hydrogen concentration sensor 211 that is used to check the purity of the oxygen gas produced and to detect in advance any potentially hazardous condition in which the % hydrogen content increases above a safety threshold. Likewise, the hydrogen produced by the cells is sent via a duct 228, coming from the stack 220, into the separation enclosure formed inside the system plate 216. The water that accumulates in the bottom of the separation enclosure of the plate 216 is recycled to the inlet 227 of a manifold (not visible) for supplying the cells 225 of the stack with water. The hydrogen introduced into the plate 216 accumulates in the chamber 237 in the upper part of the system plate 216. Opening into this chamber 237 is the sensitive unit 233 of the hydrogen concentration sensor 212 that is used to check the purity of the hydrogen gas produced, which may be discharged via a withdrawal tap 230. The reaction is supplied with electrical energy by a generator to which a current-collecting plate on the anode circuit side 235 and a current-collecting plate on the cathode circuit side 236 are connected.

What has therefore been described is an operational control system for an electrochemical reactor, a fuel cell stack or an electrolyser, which is well suited to the continuous operation of this apparatus, without requiring samples to be taken outside the chambers integrated into the body of the reactor or even having to stop the operation thereof. The versatility, the operational flexibility, the wide sensitivity range and the excellent response time of the thermal conductivity sensor, in the particular environment of electrochemical reactors and especially redox reactors in which hydrogen is involved, make this type of sensor a precious tool. It is more particularly effective for measuring the hydrogen concentration, and possibly that of other gases, especially carbon dioxide $CO_2$, in the medium monitored and for managing, in a simple and economic manner, the operating conditions and parameters of an electrochemical reactor. This is even more so when, not content with applying such a measurement to the management of a single functionality of the sensor, the intention is to benefit therefrom for simultaneously or concomitantly controlling several parameters liable to have an impact on the running of the stack, on the conditions for maintaining it in the standby state and the performance thereof when in continuous operation. By using gas concentration sensors based on measuring thermal conductivity, it is possible to implement a substantial number of functions for controlling such an electrochemical process. The system also makes it possible both for the quality of the gases, delivered in the case of an electrolyser, to be monitored and the operational safety thereof to be permanently checked.

Of course, the invention is not limited to the examples described and illustrated, and various modifications may be made thereto without departing from the scope of the invention defined by the appended claims.

The invention claimed is:

1. An electrochemical reactor comprising:
 a stack of electrochemical cells, each of the cells including a bipolar plate having an anode plate portion and a cathode plate portion;
 a manifold connected to the cells in an exchange circuit, for exchanging a gas in the circuit with outside of the stack;
 a sensor sensitive to a composition of the gas in the circuit;
 a monitor for monitoring a condition of the reactor based on an output from the sensor; and
 two end plates sandwiching the stack therebetween, one of the two endplates being a system plate positioned on one side of the stack, the system plate including:
  an internal wall positioned adjacent an end cell of the stack,
  an external wall positioned opposite the internal wall,
  a lateral wall separating the internal wall and the external wall, the lateral wall having:
   a first end that interfaces and extends laterally from a chamber-side surface of the internal wall,
   a second end that interfaces and extends laterally from a chamber-side surface of the external wall,
   a chamber-side surface, and
   an external surface, and
  a first chamber bounded by and directly interfacing the chamber-side surface of the internal wall, the chamber-side surface of the external wall, and the chamber-side surface of the lateral wall, such that the first chamber is located wholly within the system plate, and such that the first chamber and the lateral wall separate the internal wall from the external wall of the system plate,
 wherein the stack and the manifold form a one-piece reactor body, with the first chamber being in communication with the manifold via an inlet opening in the internal wall,
 wherein the sensor is mounted on the lateral wall separating the internal wall and the external wall of the system plate, such that the sensor extends through a hole in the lateral wall, with a portion of the sensor being positioned external to the external surface of the lateral wall, and with a sensing device of the sensor being positioned, internal to the external surface of the lateral wall so that the sensing device is directly exposed to an in situ concentration of a component of the gas in the first chamber, and
 wherein the sensing device is separated from an atmosphere of the first chamber by a filter that is gas-permeable and water-impermeable.

2. An electrochemical reactor according to claim 1, wherein the internal wall of the system plate has a stack-side surface that faces the end cell of the stack, such that the manifold passes through the stack and opens onto the inlet opening in the internal wall, the inlet opening extending through the stack-side surface and the chamber-side surface of the internal wall into the first chamber, and
 wherein the external wall of the system plate has an outside surface that forms a support surface for fixing an element of the circuit outside of the reactor body.

3. An electrochemical reactor according to claim 2, wherein the sensor includes a hollow end piece positioned in the hole in the lateral wall, the hollow end piece enclosing a cavity that communicates with an atmosphere of the first chamber, and
 wherein the sensing device is housed in the cavity of the hollow end piece.

4. An electrochemical reactor according to claim 3, wherein the cavity of the hollow end piece is separated from another chamber of the sensor by a gas-tight and liquid-tight partition, the other chamber being formed in the portion of the sensor positioned external to the external surface of the lateral wall, relative to the first chamber, and
 wherein the monitor includes a processor for processing signals from the sensing device, the processor being mounted on the portion of the sensor positioned external to the external surface of the lateral wall.

5. An electrochemical reactor according to claim 4, wherein the partition is sealingly penetrated by conductors extending from the sensing device, the partition being resistant to a differential pressure between the cavity and the other chamber of the sensor.

6. An electrochemical reactor according to claim 1, wherein the sensor is sensitive to variations in thermal conductivity of the gas in the circuit, in order to obtain a measurement that depends on a hydrogen content of the gas in the first chamber.

7. An electrochemical reactor according to claim 1, wherein the reactor body includes:
 a second manifold connecting the cells of the stack to a second chamber integrated into the reactor body in a second exchange circuit, and
 a second sensor sensitive to a composition of gas in the circuit, the second sensor being mounted in the reactor body and being provided with a sensing device exposed directly to an in situ concentration of a component of the gas in the second chamber.

8. An electrochemical reactor according to claim 1, wherein the monitor includes a processor positioned in immediate proximity to the sensing device, the processor being fixable to the reactor body on the portion of the sensor positioned external to the external surface of the lateral wall.

9. An electrochemical reactor according to claim 1, wherein the sensor detects a carbon dioxide concentration in an environment of the sensing device.

10. An electrochemical reactor according to claim 1,
 wherein the sensor is sensitive to variations in thermal conductivity of the gas in which the sensor is immersed, the thermal conductivity depending on a hydrogen concentration of the gas in the circuit and on a water vapour concentration of the gas in the circuit, and
 wherein the sensor includes a controller for controlling plural measurements of thermal conductivity in an environment of the sensing device for different heating temperatures in order to determine the water vapour concentration in the environment.

11. The electrochemical reactor according to claim 1,
 wherein the sensor is sensitive to variations in thermal conductivity of the gas in which the sensor is immersed, the thermal conductivity depending on a hydrogen concentration of the gas in the circuit and on a water vapour concentration of the gas in the circuit,
 wherein the electrical reactor further comprises a second sensor sensitive to a humidity of the gas in the first chamber, and
 wherein the monitor includes a processor for providing a measurement of the hydrogen concentration in the first chamber based on a signal from the sensor sensitive to the composition of the gas in the circuit and a signal from the second sensor sensitive to the humidity of the gas in the first chamber.

12. The electrochemical reactor according to claim 1,
 wherein the electrochemical reactor is incorporated in a fuel cell stack,
 wherein the circuit is a hydrogen gas circuit,
 wherein the sensor is mounted in the hydrogen gas circuit, and
 wherein the hydrogen gas circuit includes:
  the first chamber for admitting a hydrogen gas coming at least partly from a hydrogen source into an entry duct of the fuel cell stack,
  an uptake line at an exit of the fuel cell stack, for uptaking the hydrogen gas after reaction in the electrochemical cells,
  an injection device for injecting at least some of the hydrogen gas coming from the uptake line into the first chamber, and
  a purge valve connected to the uptake line, wherein action of the purge valve is under control of a controller that is controlled by the sensor to maintain a hydrogen concentration in the first chamber above a predetermined purity level.

13. An electrochemical reactor according to claim 1,
 wherein the electrochemical reactor is incorporated in a fuel cell stack,
 wherein the circuit is a hydrogen gas circuit,
 wherein the sensor is a hydrogen concentration sensor, and
 wherein the monitor maintains a hydrogen concentration above a predetermined threshold during at least one of a shut-down phase and a standby state during which no energy is produced, in response to a signal from the hydrogen concentration sensor in the hydrogen gas circuit.

14. An electrochemical reactor according to claim 1,
 wherein the electrochemical reactor is incorporated in a fuel cell stack,
 wherein the gas in the circuit is oxygen gas in an oxygen gas circuit,
 wherein the sensor is an oxygen gas sensor, and
 wherein the electrochemical reactor further comprises a hydrogen gas sensor mounted in the oxygen gas circuit to detect a presence of hydrogen gas in the oxygen gas.

15. An electrochemical reactor according to claim 1,
 wherein the electrochemical reactor is incorporated in an electrolyser,
 wherein the circuit is a hydrogen gas circuit,
 wherein the hydrogen gas circuit includes a hydrogen separator,
 wherein the hydrogen separator includes:
  the first chamber,
  gas outlets of cathodes of the cells of the stack, the gas outlets being connected to the first chamber, and
 wherein a portion of the sensor is positioned in the first chamber so as to deliver to a controller at least one signal corresponding to a hydrogen concentration in the hydrogen gas circuit.

16. An electrochemical reactor according to claim 1,
 wherein the electrochemical reactor is incorporated in an electrolyser,
 wherein the gas in the circuit is oxygen gas in an oxygen gas circuit,
 wherein the oxygen gas circuit includes an oxygen separator,
 wherein the oxygen separator includes:
  the first chamber,
  gas outlets of anodes of the cells of the stack, the gas outlets being connected to the first chamber, and
 wherein the sensor is a hydrogen concentration sensor and delivers to a controller at least one signal corresponding to a hydrogen concentration in the oxygen gas circuit.

* * * * *

UNITED STATES PATENT AND TRADEMARK OFFICE
CERTIFICATE OF CORRECTION

PATENT NO. : 10,062,915 B2
APPLICATION NO. : 13/497011
DATED : August 28, 2018
INVENTOR(S) : Gino Paganelli Page 1 of 1

It is certified that error appears in the above-identified patent and that said Letters Patent is hereby corrected as shown below:

In the Specification

Column 2:
Line 65, "2009/00611261" should read --2009/0061261--.

In the Claims

Column 20:
Line 27, "positioned," should read --positioned--.

Signed and Sealed this
Sixteenth Day of April, 2019

Andrei Iancu
*Director of the United States Patent and Trademark Office*